(12) United States Patent
Uematsu et al.

(10) Patent No.: US 9,505,860 B2
(45) Date of Patent: Nov. 29, 2016

(54) HIGH-PRESSURE RADIAL ETHYLENE POLYMERIZATION PROCESS IN WHICH ETHYLENE IS POLYMERIZED WITH A SPECIFIC POLYUNSATURATED OLEFIN GRADE

(71) Applicant: BOREALIS AG, Vienna (AT)

(72) Inventors: Takashi Uematsu, Stenungsund (SE); Thomas Hjertberg, Kungshamn (SE); Mattias Bergqvist, Gothenburg (SE); Bjorn Voigt, Hisings Backa (SE); Bernt-Ake Sultan, Stenungsund (SE)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/376,752

(22) PCT Filed: Mar. 12, 2013

(86) PCT No.: PCT/EP2013/000726
§ 371 (c)(1),
(2) Date: Aug. 5, 2014

(87) PCT Pub. No.: WO2013/149699
PCT Pub. Date: Oct. 10, 2013

(65) Prior Publication Data
US 2015/0073104 A1    Mar. 12, 2015

(30) Foreign Application Priority Data

Apr. 2, 2012   (EP) ..................................... 12002399

(51) Int. Cl.
| | | |
|---|---|---|
| *C08F 2/00* | (2006.01) |
| *C08F 12/34* | (2006.01) |
| *C08F 236/00* | (2006.01) |
| *C08F 210/00* | (2006.01) |
| *C08F 4/28* | (2006.01) |
| *C08F 210/02* | (2006.01) |
| *C08F 110/02* | (2006.01) |

(52) U.S. Cl.
CPC ............ *C08F 210/02* (2013.01); *C08F 110/02* (2013.01)

(58) Field of Classification Search
CPC ...... C08F 110/02; C08F 210/02; C08F 2/00; C08F 236/20
USPC ........................... 526/63, 336, 337, 348, 227
See application file for complete search history.

(56) References Cited

U.S. PATENT DOCUMENTS

| | | | | |
|---|---|---|---|---|
| 5,539,075 | A | * | 7/1996 | Gustafsson et al. .......... 526/339 |
| 5,763,718 | A | | 6/1998 | Tsuda et al. |
| 2009/0020749 | A1 | * | 1/2009 | Jager et al. ..................... 257/40 |

FOREIGN PATENT DOCUMENTS

| | | |
|---|---|---|
| EP | 0 704 417 | 4/1996 |
| GB | 935724 | 11/1961 |
| JP | 10-231257 A | 9/1998 |
| WO | WO 93/08222 | 4/1993 |
| WO | WO 2008/003559 A1 | 1/2008 |
| WO | WO 2009/012041 | 1/2009 |
| WO | WO 2010/042390 A1 | 4/2010 |
| WO | WO 2011/057926 | 5/2011 |
| WO | WO 2011/057927 A1 | 5/2011 |
| WO | WO 2011/057928 | 5/2011 |

OTHER PUBLICATIONS

International Preliminary Report on Patentability issued Oct. 7, 2014 for International application No. PCT/EP2013/000726.
International Search Report mailed May 23, 2013 for International application No. PCT/EP2013/000726.
Written Opinion mailed May 23, 2013 for International application No. PCT/EP2013/000726.

* cited by examiner

*Primary Examiner* — William Cheung
(74) *Attorney, Agent, or Firm* — Richard M. Klein; Fay Sharpe LLP

(57) ABSTRACT

The present invention relates to a high-pressure radical ethylene polymerization process in which ethylene is polymerized with a polyunsaturated olefin comprising at least 6 carbon atoms and at least two non-conjugated double bonds of which at least one is terminal, characterized in that a polyunsaturated olefin grade is used as a starting material which yields a percentage of less than 6.3% in the zero conversion test or which has a decomposition temperature as measured by DSC of 130° C. or more.

11 Claims, No Drawings

HIGH-PRESSURE RADIAL ETHYLENE POLYMERIZATION PROCESS IN WHICH ETHYLENE IS POLYMERIZED WITH A SPECIFIC POLYUNSATURATED OLEFIN GRADE

The present application is a National Stage Application of PCT International Application No. PCT/EP2013/000726 filed on Mar. 12, 2013, under 35 U.S.C. Section 371, which claims priority to European Patent Application No. 12002399.0 filed on Apr. 2, 2012, which are each hereby incorporated by reference in their respective entireties.

The invention relates to a high-pressure radical ethylene co-polymerization process in which ethylene is co-polymerized with a polyunsaturated olefin.

In high pressure radical ethylene polymerization reactions ethylene monomers and, optionally, polyunsaturated comonomers, are polymerized under very high pressure, which is usually above 100 MPa, and at temperatures of usually above 100° C. The radical polymerization reaction is started by the use of a radical initiator such as $O_2$ or a peroxide.

It is often necessary to heat the compressed reaction mixture in order to reach a temperature suitable for the radical initiator to decompose and, thus, start the polymerisation reaction. This is normally done by passing the reaction mixture (not yet comprising the radical initiator) through a pre-heater, e.g. heated tubes. In spite no radical initiator is present in the pre-heater, it has been observed that often polymerization occurs at the walls of the pre-heater yielding a thin polymer film covering the wall. Such a film reduces heat transfer efficiency. In the following this is denoted "pre-heater fouling". In case this fouling grows rapidly without being removed, e.g. by the process stream at the same rate, the average temperature of the reaction mixture entering the reactor is decreasing. Said average temperature may even drop below the desired decomposition temperature of the radical initiator. Hence, the initiator is not able to form free radicals at the desired rate and, thus, the rate of polymerization in the reactor where the reaction mixture is fed into may be greatly reduced or the reaction may even completely stop. Passing unreacted radical initiator through the reactor is a major safety concern as the polymerisation reaction may be initiated at undesired locations within the plant.

In case of a polyunsaturated comonomer having at least two non-conjugated double bonds usually only one of the double bonds is incorporated into the main polymer chain during polymerisation whereby the other(s) remain unaffected and, thus, increases the double-bond content of the polymer. Such an increased double-bond content improves the cross-linking properties of the polymer. It has been observed that fouling may already occur in pure ethylene feeds. However, in case the reaction mixture is containing polyunsaturated comonomers, the reaction mixture is even more prone to fouling, e.g. pre-heater fouling, compared with pure ethylene feed.

Thus, there is the need for a high-pressure radical ethylene polymerization process wherein pre-heater fouling is avoided or at least significantly reduced.

It has been surprisingly found that the above object can be achieved by using specific grades of polyunsaturated olefin in a high-pressure radical ethylene co-polymerization process in which ethylene is co-polymerized with polyunsaturated olefin.

Therefore, the present invention provides in a first embodiment a high-pressure radical ethylene polymerization process in which ethylene is polymerized with a polyunsaturated olefin comprising at least 6 carbon atoms and at least two non-conjugated double bonds of which at least one is terminal, characterized in that a polyunsaturated olefin grade is used as a starting material which yields a percentage of less than 6.3% in the zero conversion test.

The pre-heater fouling is considered to be due to impurities contained in the reaction mixture originating from the used grade of the polyunsaturated olefin. These impurities are believed to generate free radicals which, in turn, initiate the polymerization reaction prior to addition of the radical initiator.

To determine whether a reaction mixture is likely to cause pre-heater fouling, the reaction mixture which is fed to the reactor (without the radical initiator) is subjected to 200 MPa and at 230° C. and the grade of conversion (i.e. polymerisation/oligomerisation) is determined. As the whole mixture which is also present prior to feeding the radical initiator is tested it can be reliably determined which grade of conversion occurs at which temperature and, thus, a suitable polyunsaturated olefin grade can be easily determined with a few experiments. This method is denoted "zero conversion test" and described in detail in the experimental part.

By using this test, polyunsaturated olefin grades can be selected which avoid unwanted pre-heater fouling or at least show significantly reduced pre-heater fouling. As a result, the temperature of the reaction mixture prior to adding the radical initiator is more stable and, thus, the properties of the product obtained are more homogeneous. Furthermore passing unreacted radical initiator through the reactor is avoided.

In a second embodiment the present invention provides a high-pressure radical ethylene co-polymerization process in which ethylene is co-polymerized with a polyunsaturated olefin comprising at least 6 carbon atoms and at least two non-conjugated double bonds of which at least one is terminal, characterized in that a polyunsaturated olefin grade is used as a starting material which has a decomposition temperature as measured by DSC of 130° C. or more.

By the processes according to the first and the second embodiment the temperature of the reaction mixture prior to adding the radical initiator is more stable and, in turn, stable reaction conditions can be maintained which lead to more homogenous product properties. Furthermore, the safety is improved as the radical initiator decomposes where desired. In addition, it is not necessary to modify the process conditions during the process depending on the varying temperature of the reaction mixture prior to adding the radical initiator, i.e. the initiator feed.

In the present invention the term "polymerisation process" denotes that two or more different monomers are co-polymerised in the process. Hence, in the polymerisation process of the present invention also three, four or more different co-monomers may be co-polymerised.

Consequently, the ethylene polymer produced in the process of the present invention may contain two or more different co-monomers.

Usually not more than five different co-monomers are used in the polymerisation process of the present invention, preferably not more than four different co-monomers and most preferably not more than three different co-monomers.

Furthermore, usually in a high pressure ethylene polymerization plant more than one product with differing compositions is produced in a continuous manner. It is desirable that the switching of the production from one product to another product can be done as fast as possible, so that as little production time as possible is lost and as little as possible intermediate products, which do not meet the specification of any of the first or second product, are produced.

When switching from one product to another, the residues present in the pre-heater fouling layers may separate from the walls and contaminate the product obtained. Thus, more time is needed until the polymer obtained from the plant meets the specification of the second product. Thus, by reducing or even avoiding pre-heater fouling the switching time is reduced. The switching time is defined to be the time from when the last polymer product in accordance with the specification for the first product is obtained until the first polymer with the specification for the second product is obtained. Thus, with the processes of the two embodiments of the invention switching from one product to another is faster.

In the present invention the reaction mixture comprises ethylene, the polyunsaturated comonomer and, optionally, one or more of the further compounds described herein.

Preferably, in the second embodiment the polyunsaturated olefin grade used as a starting material yields a percentage of less than 6.3% in the zero conversion test.

Preferably, in the first embodiment a polyunsaturated olefin grade is used as a starting material which has a decomposition temperature as measured by DSC of 130° C. or more.

Unless explicitly mentioned to the contrary, in the following preferred features of all embodiments of the invention are described.

Preferably, the polyunsaturated olefin grade used yields a percentage of less than 5.0% in the zero conversion test, more preferably, the polyunsaturated olefin grade used yields a percentage of less than 3.5% in the zero conversion test, even more preferably, the polyunsaturated olefin grade used yields a percentage of less than 2.0% in the zero conversion test.

In the present invention the zero conversion test is carried out at 200 MPa and at 230° C.

Although the purity of polyunsaturated olefin, i.e. the amount of impurities, can be determined by several means, the amount of (undefined) impurities alone is usually not decisive whether pre-heater fouling occurs or not but the type of impurities. Hence, a high amount of impurities not causing pre-heater fouling is of course less problematic compared with a small amount of impurities causing pre-heater fouling.

As already outlined above, it is believed that unwanted radicals forming and originating from impurities of the used polyunsaturated olefin grade are believed to be predominantly responsible for pre-heater fouling. Usually such radicals form upon thermal decomposition.

The decomposition temperature of a compound or mixture of compounds can be determined by differential scanning calorimetry (DSC). In the present invention decomposition temperature denotes the temperature at which the exothermal reaction reaches its maximum according to the DSC thermogram. The type of impurities affects the shape of this peak and thus the actual decomposition may start at a lower temperature.

However, the impurities may have a low decomposition temperature and, thus, may form radicals, which, in turn, cause fouling. It has been found that polyunsaturated olefin grades having a decomposition temperature as measured by DSC of at least 130° C. are particularly advantageous in the process according to the present invention.

Preferably, the polyunsaturated olefin grade used as a starting material has a decomposition temperature as measured by DSC of 140° C. or more.

In the present invention "polyunsaturated olefin grade" denotes the polyunsaturated olefin containing impurities, e.g. by-products from the manufacturing process which have not been separated. Thus, the above concentration ranges for the polyunsaturated olefin grade refer to the grade including the impurities. Sometimes the separation of such by-products is not even reasonable under commercial aspects. Normally the content of impurities is 20 wt. % or less based on the grade of the polyunsaturated olefin.

It has been found that even a comparatively low purity of 85% of the polyunsaturated olefin grade may be suitable. Hence, preferably, the polyunsaturated olefin grade has a purity of 85% or higher, more preferably has a purity of 90% or higher, even more preferably of 95% or higher and most preferably of 98% or higher.

Polymerization of ethylene (co)polymers by free radical initiated polymerization at high pressure (referred to as high pressure radical polymerization) is since long known in the art. Generally, the polymerization is performed reacting the monomers under the action of one or more radical initiators such as, peroxides, hydroperoxides, and oxygen or azo compounds, usually oxygen, peroxides, or azo compounds are used, in a reactor at a temperature of about 80 to 350° C. and at a pressure of 100 to 500 MPa.

Usually, the polymerization is carried out in either an autoclave or a tubular reactor, commonly in a continuous manner.

The autoclave process may, for example, be conducted in a stirred autoclave reactor. The stirred autoclave reactor is commonly divided into separate zones. The main flow pattern is from top zone(s) to bottom zone(s), but backmixing is allowed and sometimes desired. The stirrer is preferably designed to produce efficient mixing and flow patterns at a suitable speed of rotation selected by a person skilled in the art. The compressed mixture is commonly cooled and fed to one or more of the reactor zones. Radical initiators may also be injected at one or more zones along the reactor. As radical initiator, any compound or a mixture thereof that decomposes to radicals at an elevated temperature can be used. Usable radical initiators are commercially available, e.g. di-tert.-butyl peroxide. The polymerization reaction is exothermic and after startup (at elevated temperature, e.g. from 80 to 150° C. to create the first radicals) the exothermic heat generated sustains the reaction. Temperature in each zone is mainly controlled by the cooled incoming feed mixture, and the flow of peroxide. Suitable temperatures range from 80 to 300° C. and pressures from 100 to 300 MPa. Pressure can be measured at least in the compression stage and after the autoclave reactor. Temperature is commonly measured for each zone of the autoclave reactor.

However, the high-pressure radical ethylene polymerization reaction is preferably performed in a tubular reactor.

Generally, monomer conversion is higher in a tubular reactor than in an autoclave reactor. Furthermore, by polymerization in a tubular reactor, ethylene (co)polymers with a branching structure well suited for cross-linking thereof can be provided.

Tubular reactors are either single-feed or multi-feed reactors, including split-feed reactors. In a single-feed tubular reactor (also referred to as front-feed reactor), the total monomer flow is fed to the inlet of the first reaction zone. In a multi-feed tubular reactor, the monomers are fed into the reactor at several locations along the reactor. In a split-feed reactor, the compressed monomer mixtures are split into two streams and fed into the reactor at different locations thereof.

Tubular reactors include one or more reaction zones. Reaction is started in each zone by injection of a radical initiator. Prior to the first zone, the reaction mixture is usually passed through a pre-heater in order to reach a temperature suitable for initiation of the first zone. Upon injection of the radical initiator, a first reaction temperature peak is obtained by the exothermal polymerization. The temperature of the reaction mixture then decreases by cooling through the tube walls while the monomer and polymer reaction mixture is flowing along the first reaction zone. The next reaction zone is defined by, again, injection of a radical initiator upon which a second reaction temperature peak and a subsequent decrease in temperature of the reaction mixture along the second reaction zone is obtained. The number of initiator injection points thus determines the number of reaction zones. A tubular reactor for the production of ethylene copolymers by high pressure radical polymerization usually comprises a total of two to five reaction zones.

After the end of the last reaction zone, the temperature and pressure of the reaction mixture including the reaction product are lowered, typically in two steps using a high pressure separator and a low pressure separator. The resulting polymer product is recovered and unreacted monomers are usually recycled back to the reactor. Further details on the production of ethylene (co)polymers by high pressure radical polymerization can be found in "Encyclopedia of Polymer Science and Engineering", Vol. 6, (1986), pages 383 to 410 which is hereby incorporated by reference.

In case the polymerisation is carried out in a tubular reactor, the reaction mixture comprising ethylene and the polyunsaturated olefin comprising at least 6 carbon atoms and at least two non-conjugated double bonds of which at least one is terminal is usually preheated before entering the reaction zone. The pre-heating is normally conducted by a pre-heater upstream of the reactor.

However, the reaction mixture comprising ethylene and the polyunsaturated olefin comprising at least 6 carbon atoms and at least two non-conjugated double bonds of which at least one is terminal may also be pre-heated prior to introduction into the reaction zone in case the process is not carried out in a tubular reactor.

Even in case no separate pre-heater is used, i.e. no fouling in such a pre-heater can occur, the process of the embodiments of the present invention are also advantageous as premature polymerisation prior to feeding the radical initiator to the reaction mixture can be avoided and even after the radical initiator is fed undesired side reactions are avoided.

Preferably, the polyunsaturated olefin comprises at least 7 carbon atoms, more preferably at least 8 carbon atoms. The polyunsaturated olefin usually comprises 30 carbon atoms or less.

The polyunsaturated olefin is preferably a $C_6$- to $C_{20}$- olefin, more preferably the polyunsaturated olefin is a $C_6$- to $C_{16}$-olefin.

Non-conjugated denotes that there is at least one atom present between the atoms of two different double bonds. Preferably, at least two, more preferably at least three and most preferably at least four atoms are present between the atoms of two different double bonds. These atoms present between the carbon atoms of two different double bonds are preferably carbon atoms.

Preferably all double bonds in the polyunsaturated olefin are carbon-carbon double bonds.

The polyunsaturated olefin usually comprises not more than four non-conjugated double bonds, preferably not more than three non-conjugated double bonds and most preferably two non-conjugated double bonds, i.e. is a diene.

Furthermore, the polyunsaturated olefin preferably has a linear carbon chain.

The polyunsaturated olefin is preferably free of heteroatoms.

Preferably all double bonds in the polyunsaturated olefin are terminal double bonds.

Most preferably the polyunsaturated olefin is selected from 1,7-octadiene, 1,9-decadiene, 1,11-dodecadiene 1,13-tetradecadiene, 7-methyl-1,6-octadiene, 9-methyl-1,8-decadiene, or mixtures thereof, more preferably from 1,7-octadiene, 1,9-decadiene, 1,11-dodecadiene and 1,13-tetradecadiene.

Besides non-conjugated double bonds the polyunsaturated compound may comprise conjugated double bonds but is preferably free of conjugated double-bonds.

Further preferred embodiments of the polyunsaturated olefin are all those as described in WO 93/08222. Those compounds are included herein by reference to this document.

Particularly preferred is 1,7-octadiene.

Commercially available 1,7-octadiene is usually prepared by the thermal conversion of cyclooctene at around 520-680° C. without any catalyst as inter alia described in GB 935,724. Although a purity of up to 99% can be obtained according to GB 935,724 it has been found that even such a high purity may cause significant pre-heater fouling.

Alternatively, the 1,7-octadiene may be produced by a catalytic process, e.g. as described in EP 0 704 417. In the process according to EP 0 704 417 butadiene is reacted with formic acid in the presence of a palladium catalyst.

The contents of GB 935,724 and EP 0 704 417 are herewith incorporated by reference.

It has been found that even when using a low purity, such as 85% or higher, of catalytically produced 1,7-octadiene a zero conversion of less than 6.3% can be obtained.

Hence, the 1,7-octadiene grade used in the process according to the present invention preferably has been produced by a catalytic process.

Preferably, in case 1,7-octadiene grade used has been produced by a catalytic process, the 1,7-octadiene grade used has a purity of 85% or higher, more preferably has a purity of 90% or higher, even more preferably of 95% or higher and most preferably of 98% or higher.

Usually, in high pressure radical ethylene polymerization processes, a chain transfer agent is used in order to control the molecular weight of the produced polymer. Chain transfer agents may be non-polar compounds, e.g. straight chain or branched alpha-olefins with three to six carbon atoms such as propylene, or may be polar compounds being e.g. straight-chain or branched saturated compounds having a group with an heteroatom such as N, S, O, e.g. an hydroxyl, carbonyl, carboxyl, alkoxy, aldehyde, ester, nitrile or sulfide group.

Hence, the reaction mixture preferably comprises a chain transfer agent.

The chain transfer agent is preferably selected from aldehydes, ketones, alcohols, saturated hydrocarbons, alpha-olefins or mixtures thereof, more preferably the chain transfer agent is selected from propionaldehyde, methylethylketon, propylene, isopropylalcohol or mixtures thereof.

Preferably the chain transfer agent is present in the reaction mixture in a concentration of at least 0.01 wt. %, more preferably of at least 0.1 wt. %, even more preferably of at least 0.2 wt. % based on the total weight of the reaction mixture.

The chain transfer agent preferably present in the reaction mixture in a concentration of 10 wt. % or less, more preferably of 7 wt. % or less and most preferably of 5 wt. % or less based on the total weight of the reaction mixture.

Preferably the polyunsaturated olefin grade is present in the reaction mixture in a concentration of at least 0.01 wt. %, more preferably of at least 0.03 wt. %, even more preferably of at least 0.06 wt. % based on the total weight of the reaction mixture.

The polyunsaturated olefin grade is preferably present in the reaction mixture in a concentration of 5 wt. % or less, more preferably of 3 wt. % or less and most preferably of 2 wt. % or less based on the total weight of the reaction mixture.

Usually ethylene is present in the reaction mixture in a concentration of 85 wt. % or more.

In case a pre-heater is present, the foregoing contents of polyunsaturated olefin preferably refer to the content when exiting the pre-heater. In case no pre-heater is present, the foregoing contents of polyunsaturated olefin and ethylene preferably refer to the content of the reaction mixture at the moment the radical initiator is added but the reaction has not started.

In case more than one reaction zone is present the term "reaction zone" refers to the first reaction zone where radical initiator is added. Usually, the reaction zone(s) are located in a reactor.

In case a pre-heater is used, preferably the reaction mixture is heated to a temperature of 100° C. or higher, more preferably 120° C. or higher and most preferably 140° C. or higher before entering the reaction zone. Usually the reaction mixture is pre-heated to a temperature of 200° C. or less.

The copolymerisation may be implemented in the presence of one or more other comonomers which can be copolymerised with ethylene and polyunsaturated olefin. Such olefinically, advantageously vinylically, unsaturated comonomers include (a) vinyl carboxylate esters, such as vinyl acetate and vinyl pivalate, (b) alpha-olefins, such as propene, 1-butene, 1-hexene, 1-octene and 4-methyl-1-pentene, (c) (meth)acrylates, such as methyl(meth)acrylate, ethyl(meth)acrylate and butyl(meth)acrylate, (d) olefinically unsaturated carboxylic acids, such as (meth)acrylic acid, maleic acid and fumaric acid, (e) (meth)acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-methyl styrene.

The copolymerisation with other comonomers besides polyunsaturated olefin is applied in particular when it is desired to make a cross-linkable polymer composition less crystalline or more polar or both. In that case the comonomer (or termonomer) should include at least one polar group, such as a siloxane, a silane, an amide, an anhydride, a carboxylic, a carbonyl, an acyl, a hydroxyl or an ester group.

Examples of such comonomers include group (a), (c), (d), (e), and (f) mentioned above.

Amongst these comonomers, vinyl esters of monocarboxylic acids having 1-4 carbon atoms, such as vinyl acetate, and (meth)acrylate of alcohols having 1-4 carbon atoms, such as methyl(meth)acrylate, are preferred. Especially preferred comonomers are butyl acrylate, ethyl acrylate and methyl acrylate. Two or more such olefinically unsaturated compounds may be used in combination. As used herein, the term "(meth)acrylic acid" is meant to encompass acrylic acid as well as methacrylic acid.

If present, the content of comonomers different from the besides polyunsaturated olefin may amount to 70 wt % of the component (C), preferably about 0.5 to 35 wt %, most preferably about 1 to 30 wt % of component (C).

The present invention is furthermore directed to the use of a polyunsaturated olefin grade as a starting material in a high-pressure radical ethylene polymerization process in which ethylene is polymerized with a polyunsaturated olefin comprising at least 6 carbon atoms and at least two non-conjugated double bonds of which at least one is terminal characterized in that the polyunsaturated olefin grade used yields a percentage of less than 6.3% in the zero conversion test.

The present invention is furthermore directed to the use of a polyunsaturated olefin grade as a starting material in a high-pressure radical ethylene polymerization process in which ethylene is polymerized with a polyunsaturated olefin comprising at least 6 carbon atoms and at least two non-conjugated double bonds of which at least one is terminal characterized in that the polyunsaturated olefin grade used has a decomposition temperature as measured by DSC of 130° C. or more.

The present invention is furthermore directed to an ethylene polymer obtainable in the process according to all of the above described embodiments of the invention.

The present invention is furthermore directed to a composition obtainable by cross-linking of the ethylene polymer obtainable in the process according to all of the above described embodiments of the invention.

The present invention is also directed to a cable comprising the ethylene polymer and/or the composition according to the invention.

The present invention will be further illustrated by the examples described below.

METHODS AND EXAMPLES

Zero Conversion Test

A set-up consisting of a multi-stage compressor, a continuously stirred tank reactor (CSTR) and a fine valve to control the pressure is used. The inner volume of the reactor is approximately 50 ml as described in Buback, M.; Busch, M.; Lovis, K.; Mahling, F-O.; Chemie Ingenieur Technik (67) no. 12 p. 1652-1655; and Buback, M.; Busch, M.; Lovis, K.; Mahling, F-O. Chem.-Ing.-Tech. 66 (1994) no. 4, p 510-513.

The content of both documents is herewith incorporated by reference.

Electrical heating coils allow for heating of the reactor walls to a desired temperature prior to each experiment and hence conditions similar to a pre-heater in a plant can be obtained. No free radical initiator, e.g. peroxide, oxygen etc. is added. Conversion is calculated as the average weight of polymer formed per time unit divided by the feed rates of the reactants.

The reactor is heated to a temperature of 230° C. A flow of 1000 g ethylene and 2.5 g propionaldehyde per hour is injected into the reactor until stable conditions are reached at a pressure of 200 MPa and an average reactor temperature of ~225° C. A flow of 4 g/h of polyunsaturated olefin grade (e.g. 1,7-octadiene) and 4 g/h heptane (solvent) is then introduced into the reactor. Depending on the reactivity, the temperature in the reactor may increase. Conversion is calculated after obtaining steady state conditions in the reactor. In the present invention steady state conditions are obtained in case the temperature did not change more than +/−1.0° C. over a period of 10 min.

It was found that when feeding only ethylene (99.75%) and propionaldehyde (0.25%) a zero conversion of typically ~0.5-1% was obtained. The heptane also exhibited a zero conversion in the same range. Here the total zero conversion is provided.

Differential Scanning Calorimetry (DSC)

The decomposition temperature was measured with Mettler TA820 differential scanning calorimeter. The sample of polyunsaturated olefin (e.g. 1,7-octadiene) was put in a pressure resistant sealable container. The measurement was started at a temperature of 40° C. and then increased (ramped) by 5° C./min until a temperature of 200° C. was reached. The heat flow (W/g) was measured during the temperature ramping.

The decomposition temperature is defined as the temperature at which the exothermal reaction reaches its peak value defined by heat flow.

Gas Purity is Provided Defined as Wt. %.

The purity was determined with a Varian 450 gas chromatograph having an FID with Galaxie CDS and colon VF-1ms, 60 m×0.32 mm×1.0 µm. 1 µl is injected and the GC % area of polyunsaturated olefin (e.g. 1,7-octadiene) is calculated as purity. The method is applicable for all comonomers according to claim 1.

Injector temperature: 150°.

Temperature profile: 60° C. for 10 min; 10° C. increase per min up to 250° C.; 250° for 2 min=31 minutes total, He flow 1.0 ml/min.

Detector temperature: 250° C.

Detector range: X 11

Make up flow 29 ml/min

Hydrogen flow 30 ml/min

Air flow 300 ml/min

EXAMPLES

For the zero conversion test octadiene grades obtained from Kuraray Co., Ltd. (JP) and Evonik Industries AG (DE) have been used.

In each run the feed consisted of 98.95 wt. % ethylene 0.4 wt. % 1,7-octadiene grade 0.4 wt. % heptane (diluent for 1,7-octadiene)

0.25 wt. % propionaldehyde,

The propionaldehyde is added to control the molecular weight of the polymer.

DSC Measurements and Zero Conversion

| No | Sample composition | DSC peak (° C.) | Zero Conversion |
|---|---|---|---|
| 1 | Octadiene 97%, Kuraray | 141.5 | 3.5% |
| 2 | Octadiene 97%, Evonik | 140.9 | 5% |
| 3 | Octadiene 87%, Kuraray | 127.6 | 9% |
| 4 | No octadiene | — | <1% |

The invention claimed is:

1. A high-pressure radical ethylene polymerization process in which ethylene is polymerized with a polyunsaturated olefin comprising at least 6 carbon atoms and at least two non-conjugated double bonds of which at least one is terminal, wherein a zero conversion test is carried out on a polyunsaturated olefin grade at 200 Mpa and 230° C. and a polyunsaturated olefin grade which yields a percentage of less than 6.3% in the zero conversion test is used as a starting material.

2. A high-pressure radical ethylene polymerization process in which ethylene is polymerized with a polyunsaturated olefin comprising at least 6 carbon atoms and at least two non-conjugated double bonds of which at least one is terminal, wherein a decomposition temperature of a polyunsaturated olefin grade is measured by DSC and a polyunsaturated grade, which has a decomposition temperature as measured by DSC of 130° C. or more is used as a starting material.

3. Process according to claim 2 wherein the polyunsaturated olefin grade used yields a percentage of less than 6.3% in the zero conversion test.

4. Process according to claim 1, wherein the polyunsaturated olefin grade used as a starting material has a decomposition temperature as measured by DSC of 130° C. or more.

5. Process according to claim 1, wherein the high pressure radical ethylene polymerization reaction is performed in a tubular reactor.

6. The process according to claim 5, wherein the reaction mixture is heated before entering the reaction zone.

7. Process according to claim 1, wherein the reaction mixture comprises a chain transfer agent.

8. Process according to claim 1, wherein polyunsaturated olefin grade is present in a concentration of 0.01% to 5% based on the total weight of the reaction mixture.

9. Process according to claim 2, wherein the high pressure radical ethylene polymerization reaction is performed in a tubular reactor.

10. Process according to claim 2, wherein the reaction mixture comprises a chain transfer agent.

11. Process according to claim 2, wherein polyunsaturated olefin grade is present in a concentration of 0.01% to 5% based on the total weight of the reaction mixture.

* * * * *